(12) United States Patent
Benson et al.

(10) Patent No.: US 6,678,665 B1
(45) Date of Patent: *Jan. 13, 2004

(54) COMPUTER SYSTEM FOR PROTECTING SOFTWARE AND A METHOD FOR PROTECTING SOFTWARE

(75) Inventors: Glenn Benson, Munich (DE); Markus Dichtl, Munich (DE)

(73) Assignee: Fujitsu Siemens Computer, München (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 569 days.

(21) Appl. No.: 08/942,743

(22) Filed: Oct. 2, 1997

(30) Foreign Application Priority Data

May 28, 1997 (EP) .............................. 97710011

(51) Int. Cl.⁷ ........................ G06F 17/60; H04K 1/00; H04L 9/00
(52) U.S. Cl. .......................................... 705/51; 705/57
(58) Field of Search ................. 705/1, 51, 57; 380/3, 4, 23, 25; 713/169, 170

(56) References Cited

U.S. PATENT DOCUMENTS

| | | | | | |
|---|---|---|---|---|---|
| 4,932,056 A | * | 6/1990 | Shamir | .......................... | 380/23 |
| 5,109,413 A | * | 4/1992 | Comerford et al. | ............. | 380/4 |
| 5,140,634 A | * | 8/1992 | Guillou et al. | ................. | 380/23 |
| 5,432,851 A | * | 7/1995 | Scheidt et al. | ................. | 380/25 |
| 5,606,617 A | * | 2/1997 | Brands | .......................... | 380/30 |
| 5,680,455 A | * | 10/1997 | Linsker et al. | ................. | 380/18 |
| 5,724,425 A | * | 3/1998 | Chang et al. | ................... | 380/25 |
| 5,745,573 A | * | 4/1998 | Lipner et al. | ................... | 380/21 |
| 5,774,525 A | * | 6/1998 | Kanevsky et al. | ........ | 379/88.02 |
| 5,841,869 A | * | 11/1998 | Merkling et al. | .............. | 380/25 |
| 5,872,917 A | * | 2/1999 | Hellman | ................... | 395/188.01 |
| 5,881,152 A | * | 3/1999 | Moos | ............................. | 380/4 |
| 6,005,935 A | * | 12/1999 | Civanlar | ....................... | 705/51 |
| 6,011,848 A | * | 1/2000 | Kanda et al. | ................ | 713/170 |
| 6,028,937 A | * | 2/2000 | Tatebayashi et al. | ......... | 713/169 |
| 6,047,242 A | * | 4/2000 | Benson | ......................... | 702/35 |
| 6,327,659 B2 | * | 12/2001 | Boroditsky et al. | .......... | 713/182 |

FOREIGN PATENT DOCUMENTS

JP            03002953 A    *  1/1991

OTHER PUBLICATIONS

Rosen, Examiner's Affidavit, Jun. 11, 1999.*
Microsoft Games, http://www.microsoft.com/Games/WEP/PRODINFO.HTM, Jun. 7,1999.*
Davis et al., "Cryptographic Randomness from Air Turbulence in Disk Drives", Advances in Cryptology: Crypto '94, Springer Verlag, pp. 114–120.
A. Menezes et al., Handbook of Applied Cryptography, CRC Press, pp. 405–424.

(List continued on next page.)

Primary Examiner—Nicholas David Rosen
(74) Attorney, Agent, or Firm—Schiff Hardin & Waite (57) ABSTRACT

A method for protecting an item of software, wherein at least one challenge means is associated with said protected item of software, and at least one response means accesses one private keying material. The challenge means has no access to said private keying material. The response means proves to the challenge means that the response means has access to the private keying material using an asymmetric probabilistic proof, e.g., zero knowledge proof. The challenge means validates this proof using the public keying material that corresponds to the response means' private keying material.

44 Claims, 3 Drawing Sheets

OTHER PUBLICATIONS

A. Choudhury et al., "Copyright Protection for Electronic Publishing Over Computer Networks", IEEE Network, May/Jun. 1995, pp. 12–20.

ISO/IEC 9594-1, "Information technology—Open Systems Interconnection—The Directory: Overview of concepts, models and services", International Organization for Standardization, Geneva, Switzerland, 1995, pp. 1–20.

R. Rivest, "The MD5 Message–Digest Algorithm", RFC 1321, pp. 1–18.

D. Knuth, The Art of Computer Programming, vol. 2, Seminumerical Algorithms, Addison–Wesley Publishing Co., Reading MA, $2^{nd}$ Edition, 1981, pp. 38–73.

* cited by examiner

FIG 4

COMPUTER SYSTEM FOR PROTECTING SOFTWARE AND A METHOD FOR PROTECTING SOFTWARE

BACKGROUND OF THE INVENTION

1. Field of the Invention

This invention relates to mechanisms for protecting software against unauthorized use, in particular against unauthorized copying.

2. Description of the Related Art

The Business Software Alliance estimates the 1995 financial losses attributed to software piracy as US$ 8.1 Billion for business application software and US$ 15.2 Billion for all software.

Solutions have been proposed in two areas:

improved Intellectual Property Rights (IPR) legislation, and enhanced electronic copy protection (ECP) mechanisms.

IPR legislation and enforcement are improving in many countries, but there are still significant difficulties in other parts of the world. As a result, some vendors are currently reassessing ECP.

Some example requirements that an ECP mechanism may potentially satisfy are listed below:

Unauthorized users or customers should be prohibited from executing protected software.

The customer should not be prohibited from making backups.

The ECP mechanism should have minimal impact upon the user interface. The visible impact should be limited to the first initial login to the operating system and/or smart card.

Only standard hardware and software assumptions should be made. For example, although hardware dongles provide copy protection services, many vendors do not wish to limit the sale of the software to the collection of customers who own or are willing to install a dongle.

The ECP mechanism should not limit execution of the protected software to a limited collection of machines. When a customer legitimately purchases software, the customer should be able to execute the software on any machine regardless of ownership. The customer should optionally be able to authorize simultaneous execution of the software in multiple machines.

The ECP mechanism should have no required network dependencies in order to execute an already purchased protected program.

The vendor should be permitted to distribute an identical version of the protected software to all customers. This requirement permits the protected software to be distributed through normal channels such as, for example, CD-ROMS, floppy disks, or network bulletin boards.

It should be excessively difficult and/or computationally infeasible for a potential software pirate to circumvent the ECP mechanism without modifying the protected program. This requirement serves as a virus-protection measure because a digital signature supplied by the vendor would not validate if a pirate distributes a modified version of the original program.

The ECP mechanism should not disclose the private keying material to the vendor, to any program produced by the vendor, or to any potential Trojan horse program. Though the primary functionality is to protect the software vendor, one must not do so at the expense of the customer.

The ECP mechanism should be available in a software-only version as well as in a hardware-assisted version, using a smart card, for example, to assure widespread market acceptance.

In the publication by Choudhury, et al., "Copyright Protection for Electronic Publishing over Computer Networks", a mechanism is proposed in which a protected document can be viewed only via a specially configured viewer program, which allows a customer to view the document only if the customer supplies to the viewer the customer's private keying material. This deters the customer from distributing unauthorized copies of the viewer program, since that would require the customer to divulge his or her private keying material to others. However, because this mechanism requires that the viewer program obtain access to the private keying material, it breaks one of the requirements described above. Furthermore, this mechanism may not be used in conjunction with a smart card that is configured to avoid releasing private keying material.

An overview on asymmetric cryptography, for example on the RSA (Rivest-Shamir-Adleman) scheme, and probabilistic encryption, for example the Blum-Goldwasser probabilistic public-key encryption scheme, can be found in the Menezes et al., book "Handbook of Applied Cryptography."

The Chi-Square Test, the Kolmogorov-Smirnov Test, and the Serial Correlation Test are described in the publication by Knuth, "The Art of Computer Programming."

An overview over different probabilistic proof schemes, for example zero knowledge proof schemes (e.g. Feige-Fiat-Shamir scheme, Guillou-Quisquater scheme, Blum-Feldmann-Micali scheme, Brassard scheme, Crepau scheme, etc.) or witness hiding proof schemes (e.g. Feige-Shamir scheme, etc.) can be found in the Menezes book.

An overview of digital signature schemes (e.g. Rivest-Shamir-Adleman, etc.,) and a formal mathematical definition of digital signatures can be found in the Menezes book.

An example of a message digest function (otherwise known as a one-way hash function) is MD5 as disclosed by Rivest in "The MD5 Message-Digest Algorithm". It is computationally infeasible or very difficult to compute the inverse of a message digest.

In the publiction by Fenstermacher et al., cryptographic randomness from air turbulence in disk drives is described.

SUMMARY OF THE PRESENT INVENTION

An object of the present invention is to provide an improved ECP (electronic copy protection) mechanism that is able to satisfy most, if not all of the example requirements described above.

Some important algorithms that are used in the present invention are listed below.

Given n (of an RSA (Rivest-Shamir-Addleman) key pair) and $\Phi$, determine the prime factors (p,q) of nEMBEDDED such that $n=p \cdot q$ and $\Phi=(p-1)(q-1)$:

$$p = \frac{(n - \Phi + 1) + \sqrt{(n - \Phi + 1)^2 - 4 \cdot n}}{2}$$

$$q = \frac{n}{p}$$

Given an RSA public key, n,e, and private key, d, compute $\Phi$.

* $Z_n$ is the set of integers modulo n
* $Z^*_n = \{X \in Z_n \mid \gcd(x,n)=1\}$
* Let $e \cdot d - 1 = 2^s t$ where t is an odd integer
  1. Select a random integer, a such that $a \in Z^*_n$
  2. Compute $w = a^{2^{s-1} t}$ 3. If $w \neq \pm 1 \pmod{n}$ go to 1
4. Result: gcd(w−1,n) where gcd denotes Greatest Common Divisor Not every well-known algorithm used by this invention is described herein. Other well-known algorithms, e.g., computing an inverse, and computing the gcd, can be found in the Menezes book.

A chosen-plaintext attack is one where the adversary chooses plaintext and is then given corresponding ciphertext. Subsequently, the adversary uses any information deduced in order to recover plaintext corresponding to previously unseen ciphertext, see Menezes.

An adaptive chosen-plaintext attack is a chosen-plaintext attack wherein the choice of plaintext may depend on the ciphertext received from previous results, again, see Menezes.

A zero knowledge proof protocol resists both chosen-plaintext attacks and adaptive chosen-plaintext attacks.

The present invention makes use of probabilistic proof. A probabilistic proof involves at least two parties, A and B. A possesses private keying material and B has no access to A's private keying material without disclosing the private keying material itself. A's proof is probabilistic rather than absolute because B forces A to demonstrate that A probably has access to the private keying material by supplying evidence.

There are two variants of probabilistic proofs:
a) zero-knowledge-proofs, where it is provable that B or any observer of the proof learns nothing from the proof, except the fact that A possesses the private keying material.
b) witness-challenge-response-proofs, which comprise the following four elements in a sequence:
  1. A sends information which is not constant for all invocations of the proof to B. This information is called the witness. For many protocols, the witness is generated randomly, and should never be repeated.
  2. B sends information to A, called the challenge. For many protocols, the challenge is generated randomly.
  3. A sends a response to B.
  4. B verifies whether A indeed knows the private keying material by executing computations involving the witness, the challenge, and the response.

In fact, many zero-knowledge-proofs are witness-challenge-response-proofs.

Zero knowledge proof schemes are e.g. the Feige-Fiat-Shamir scheme or the Guillou-Quisquater scheme, but also the Mono-directional zero knowledge proof schemes, e.g. the Blum-Feldmann-Micali scheme, or Statistical zero knowledge proof schemes, e.g. the Brassard scheme or the Crepau scheme, etc.

Witness hiding proof schemes are e.g. the Feige-Shamir scheme, etc.

One should not confuse probabilistic public-key encryption (for, the purpose of providing confidentiality) with probabilistic proofs. In the first case, probabilistic means are used to execute the encryption algorithm. In the second case, probabilistic means are used to define a degree of assurance for a service such as identification.

In the following, one possible general structure of a zero-knowledge protocol is described (cp. Menezes, et al.). For illustrative purposes, this general structure is also of the witness-challenge-response-proof format.

The protocol involves two parties, A and B.
1. The prover claiming to be A selects a random element from a pre-defined set as its secret commitment (providing hidden randomization), and from this computes an associated (public) witness. This provides initial randomness for variation from other protocol runs, and defines a set of questions all of which the prover claims to be able to answer, thereby a priori constraining his or her forthcoming response. Only the legitimate party A, with knowledge of A's secret, is truly capable of answering all the questions, and the answer to any one of these provides no information about A's long-term secret.
2. B's subsequent challenge selects one of these questions.
3. A provides its response.
4. B checks the response for correctness.

The protocol may be iterated to improve the bound which limits the probability of successful cheating.

Each customer may post his or her public keying material to a publicly accessed directory without compromising the corresponding private keying material. The customer usually should guard his or her private keying material as a close secret, as otherwise the cryptographic system may not guarantee correctness. The best known mechanism for protecting one's private keying material is through the use of a smart card. In this case, the smart card is a device with no interface for releasing private keying material (in a non-cryptographically protected form).

Although smart cards provide the best protection, social factors of electronic commerce may provide a role in ensuring private keying material protection. One of the significant difficulties associated with asymmetric cryptographic services is authentication. For example, if A posts his or her public keying material to a public directory, then how does B assess validity? That is, a pirate may attempt to masquerade as A but post the pirate's keying material. Some commercial organizations provide solutions to this problem by acting as Certification Authorities (CA). For (possibly) a fee, the CA solicits identifying material from potential customers such as a driver's license or passport. After validating the identifying material, the CA posts the customer's public keying material to a public directory, and the CA signs a certificate (using a digital signature with the CA's private keying material) that holds the customer's public keying material. Standardized services, for example X.500, may be adopted to help facilitate the use of directories that contain public keying material.

Once a customer posts his or her public keying material to the CA, the customer should make an effort to protect his or her private keying material. In this case, if the customer's private keying material were to become unknowingly compromised, then the private keying material could no longer be used in a meaningful way.

According to the invention there is provided a computer system comprising a protection mechanism for protecting software, the protection mechanism comprising at least one challenge means associated with a protected item of software, and at least one response means in which private keying material is accessed, wherein:
a) the challenge means has no access to the private keying material,
b) the response means comprises means for proving to the challenge means that the response means has access to the private keying material by interacting with the challenge means using a probabilistic proof scheme, and
c) the challenge means comprises means for prohibiting a customer from using some or all of the items of software unless the challenge means knows that the probabilistic proof is successful.

According to a further aspect of the invention, there is provided a computer system comprising means for inputting a program to be protected, and for embedding at least one challenge means in that program, wherein the challenge means comprises means for     participating in a probabilistic proof protocol,     validating that the response means possesses the private keying material,     prohibiting a customer from using some or all of the program unless the validation succeeds.

According to a further aspect of the invention, there is provided a method of distributing software to a plurality of customers wherein each customer has a computer system having a protection mechanism for protecting software, the protection mechanism including at least one challenge means associated with a protected item of software, and at least one response means with private keying material that it can access, wherein: a) the challenge means has no access to the private keying material; b) the response means includes means for proving that it has access to the private keying material by interacting with the challenge means using a probabilistic proof scheme; c) the challenge means comprises means for prohibiting a customer from using some or all of said items of software unless the challenge means knows that the probabilistic proof is successful, and wherein every customer receives an identical copy of said protected program and of said challenge means.

According to a further aspect of the invention, there is provided a method for protecting an item of software, wherein at least one challenge means is associated with the protected item of software, and at least one response means accesses private keying material,     a) the challenge means has no access to the private keying material,     b) the response means proves that it has access to the private keying material by interacting with the challenge means using a probabilistic proof scheme, and     c) the challenge means prohibits a customer from using some or all of the items of software unless the challenge means knows that the probabilistic proof is successful.

According to a further aspect of the invention, it may be advantageous to generate random values by either the challenge means or the response means by repeatedly timing responses to device accesses in order to enforce the security of the random value. Although one may potentially time responses to any one of a variety of devices, in this present example we assume a disk (commonly known as a hard disk and sometimes known as a direct access storage device). Additionally, it is possible to query multiple different devices when generating one particular random value.

According to a further aspect of the invention, in order to further enforce the security of the random value one may, while generating the random value, fork new threads in such a manner as to introduce an additional degree of randomness into the random value by exploiting unpredictabilities in the operating system's scheduler.

According to a further aspect of the invention, in order to further enforce the security of the random value one may perform a statistical test to determine the number of random bits obtained by each of the disk accesses, and cause disk accesses to be repeated until a predetermined number of random bits has been obtained.

DETAILED DESCRIPTION OF THE PREFERRED EMBODIMENTS OF THE INVENTION

One protection mechanism in accordance with the invention will now be described by way of example with reference to the accompanying drawings.

Purchasing Protocol

Figure 1:
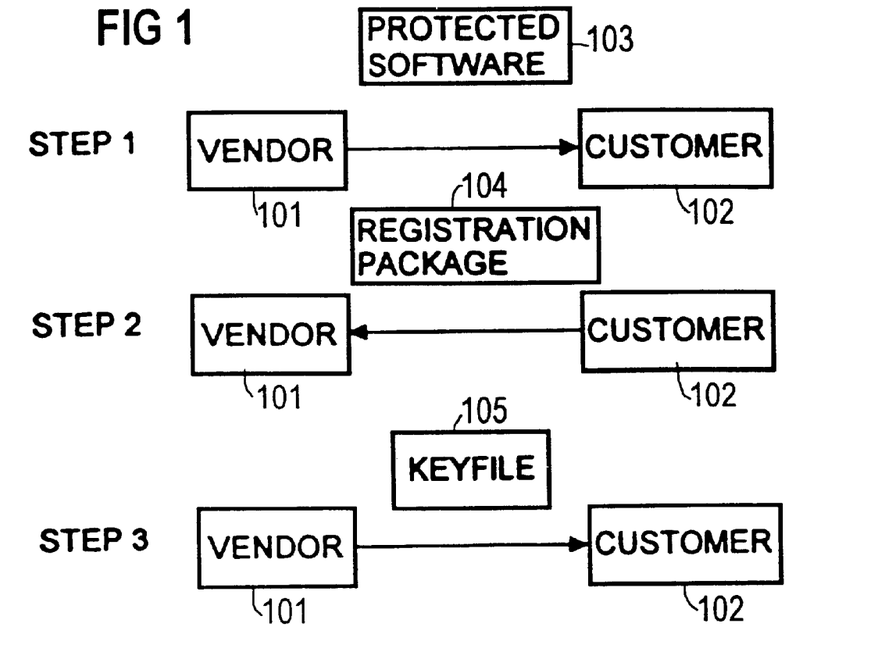
FIG. 1 is a flow diagram of a purchasing protocol used when a customer wishes to purchase software that is protected by a protection mechanism in accordance with the present invention.

FIG. 1 shows a purchasing protocol used when a customer 102 wishes to purchase software that is protected by an ECP (Electronic Copy Protection) mechanism in accordance with the invention. The vendor 101 has public and private keying material used for digital signatures; and each potential customer 102 has public and private keying material used for probabilistic proof protocols. Each party makes its public keying material available to other parties, but keeps its private keying material secret.

Figure 2:
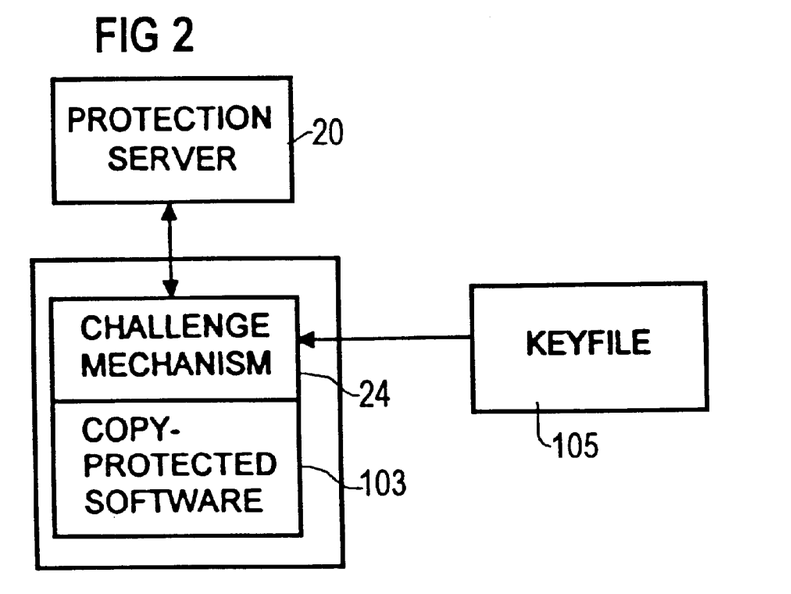
FIG. 2 is a block diagram showing the software components that are required to be installed in the customer's machine to enable the customer to run the protected software.

In step 1, the customer 102 obtains the protected software 103 from a vendor 101 by downloading the software from a network bulletin board. A challenge mechanism 24 (cp. FIG. 2), to be described later in detail, is embedded in the protected software 103 in such a way that a potential attacker cannot easily separate the challenge mechanism 24 from the protected program 103. The attacker would need to disassemble the code and to manually remove or modify the challenge mechanism. The challenge mechanism 24 has the vendor's public keying material embedded in it. As will be described the challenge mechanism 24 prevents the customer from running the software at this stage. The entire protected program, including the challenge mechanism is signed using the vendor's private keying material.

In step 2, the customer 102 sends a registration package 104 to the vendor 101 by electronic mail. The registration 35 package 104 contains a reference to a public directory that holds the customer's public keying material.

In step 3, the software vendor 101 locates the customer's public keying material and embeds the customer's public keying material into a keyfile 105 and sends the keyfile 105 to the customer 102 by electronic mail. Once the customer 102 installs the keyfile, the protection mechanism permits the customer 102 to execute the protected software 103 (provided that the customer can prove that he or she has access to the customer's private keying material via a probabilistic proof).

The creation of the keyfile 105 is performed by a keyfile generator, which is a program that executes at the vendor's facility. The vendor 101 must take care to guard this program.

In use of the keyfile generator, an operator enters the following information:

| | |
|---|---|
| Vendor name: | Vendor name is the name of the vendor's company. |
| Vendor password: | Vendor password is the password that unlocks the vendor company's private keying material. Company employees who do not know the password cannot generate keyfiles. |
| Customer name: | The customer name is the distinguished name (as defined in the ISO standard of a customer for whom to generate a keyfile. The name indexes into a database of public keying material. |
| Keyfile name: | The keyfile name is the name of a new keyfile. |

After obtaining this information, the keyfile generator builds a keyfile 105, containing the customer's public keying material. Portions of the keyfile 105 appear to the customer 102 as a completely random sequence of values.

Building of the keyfile 105 involves the following operations.

First, the keyfile generator creates a file and inserts the customer's public keying material into the file along with thousands of decoy bits. In the present example, each keyfile 105 contains approximately 480,000 decoy bits. This number of bits represents a significant amount of decoy material, yet can fit into a standard e-mail message.

Each keyfile 105 stores the customer's public keying material in a different location. Additionally, each keyfile 105 has encrypted customer information embedded in it without disclosing the required encryption key. This encrypted customer information permits a software vendor to easily identify the owner of a keyfile 105 in the event that the keyfile 105 appears in a public location such as a bulletin board. The keyfile generator then encrypts and re-encrypts the keyfile (or portions of the keyfile) multiple times using different algorithms. Finally, the keyfile generator signs the keyfile using the vendor's private keying material by applying a digital signature algorithm.

A keyfile is said to be validated if the challenge means can validated the vendor's signature using the public keying material stored in the challenge means binary and access the decrypted public keying material stored in the keyfile.

Customer Software

FIG. 2 shows the software components that are required to be installed in the customer's machine, such as a computer, to enable the customer to run the protected software 103. These consist of a protection server 20. Also shown are the keyfile 105 and the protected software 103. The copy protected software 103 includes a challenge mechanism 24.

The protection server 20 is a program that the customer 102 executes when the system initially boots. The customer 102 enables the system by inserting a floppy disk that contains an encrypted copy of the customer's private keying material. The protection server 20 then prompts the customer 102 for a pass phrase used to decrypt the floppy. The protection software does not continue executing if the customer cannot supply the correct pass phrase. The protection server 20 then executes in the background waiting for requests for participating in a probabilistic proof.

It should be noted that the protection server 20 never releases the customer's private keying material out of its process boundary. The protection server 20 relies on operating system protections to ensure its own integrity. The protection server 20 executes in its own address space and communicates with external processes.

Operation of the Protection Mechanism

Figure 3:
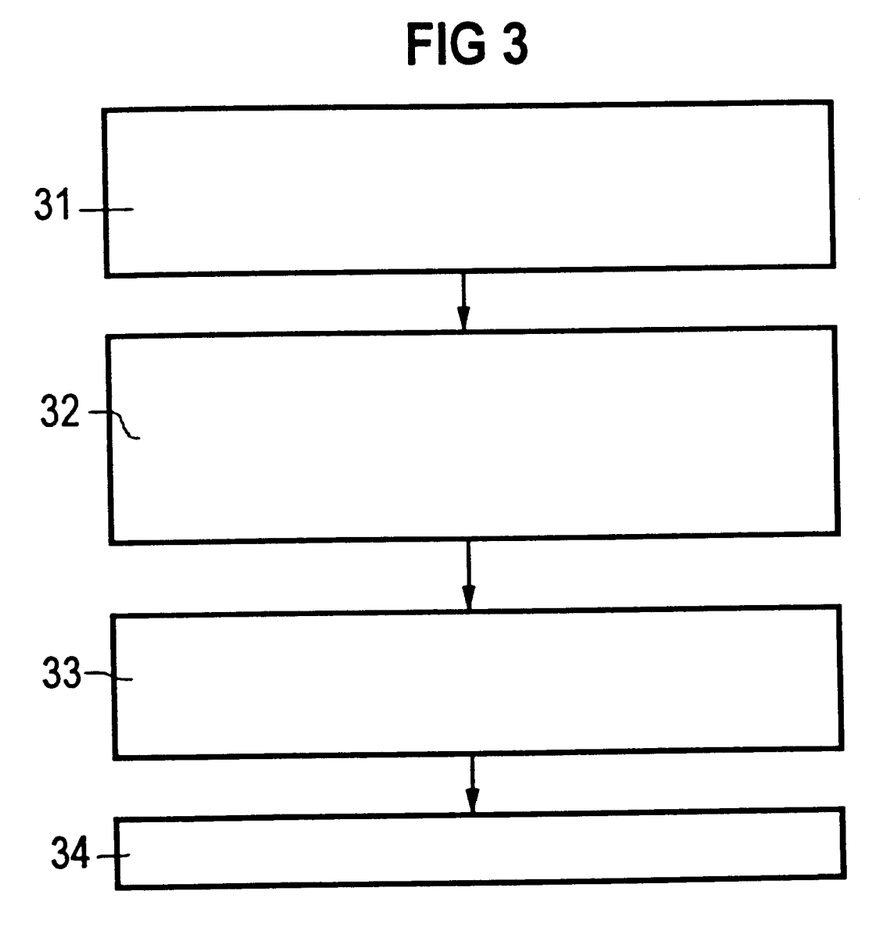
FIG. 3 is a flow diagram showing the operation of the protection mechanism in the protected software.

FIG. 3 shows the operation of the protection mechanism. This is performed when the customer initially attempts to execute the protected software 103, and may also be repeated periodically during execution of the protected software 103 at the discretion of the challenge mechanism (by sending a message to the response mechanism 24 requesting execution).

(With reference to Box 31) When the challenge mechanism 24 starts the process, the challenge mechanism 24 accesses the keyfile 105 associated with the protected software 103 and calls a digital signature validation function in the challenge mechanism 24 to validate the vendor's signature of the keyfile 105 using the vendor's public keying material that is embedded in the challenge mechanism 24. This validation of the keyfile signature ensures that an attacker cannot modify the keyfile 105 or its digital signature without additionally modifying the challenge mechanism 24. Vendors may optionally augment this protection using additional proprietary lines of defense. If the keyfile 105 has been modified, the challenge mechanism 24 hangs (i.e. halts) the program, or otherwise disturbs normal program execution.

Assuming the signature of the keyfile 105 is validated, the challenge mechanism 24 then parses the keyfile 105, using a proprietary, vendor-specific algorithm, to locate the customer's public keying material in the keyfile 105, and extracts the customer's public keying material.

Then, using the protection server 20, a probabilistic proof scheme is carried out as follows (in this embodiment, the Guillou-Quisquater identification protocol is described).

In the following protocol description, the protection server 20 is named as party A and the challenge mechanism 24 is named as party B.

Calculate System Parameters (Box 31):

a. Using the prime factorization, p and q, suitable for use in the computation of an RSA (Rivest-Shamir-Adleman)-like key pair, compute n=p·q and Φ=(p−1)(q−1).

b. A defines a public exponent $\upsilon \geq 3$ with gcd($\upsilon$, Φ)=1 where nEMBEDDED gcd is the Greatest Common Divisor.

c. A computes a private exponent s=$\upsilon^{-1}$(modΦ).

d. System parameters ($\upsilon$,n) are made available as the public keying material.

Calculate User Parameters (Box 32):

a. A selects and publishes a well known identity I and the redundant identity J=f(I) satisfying I<J<n using a known redundancy function f. An example of the redundancy function f the redundancy mapping of the preprocessing stage of ISO/IEC 9796 (see the publication, "Information technology-Security Techniques-Digital Signature Scheme Giving Message Recover").

b. A retains as the private keying material $s_A=J^{-s}$(mod n).

The GQ (Guillou-Quisquater) key pair is (private key=$s_A$) and (public key=($\upsilon$,n)). A makes known to B, I, f, and J=f(I). B validates that J=f(I) (Box 33).

The protocol messages of the GQ proof protocol are presented below:

$$A \rightarrow B: I, x=r^{\upsilon} \pmod{n} \quad (1)$$

$$B \rightarrow A: e \text{ (where } 1 \leq e \leq \upsilon) \quad (2)$$

$$A \rightarrow B: y=r \cdot s_A^e \pmod{n} \quad (3)$$

A proves its identity to B by t executions of the following steps where B accepts A's identity only if all t executions are Successful (Box 34).

a. A selects a random secret integer r (the commitment), $1 \leq r \leq n-1$, and computes (the witness) x=$r^{\upsilon}$(mod n)

b. A sends to B the pair of integers (I,x)

c. B selects and sends to A, a random integer e (the challenge), $1 \leq e \leq \upsilon$ d. A computes and sends to B (the response) y=r·$s_A^e$ (mod n) B receives y, constructs J from I using f, computes z=$J^e \cdot y^{\upsilon}$ (mod n) and accepts A's proof of identity if both z=x and z≠0.

If the challenge mechanism 24 as party B does not accept A's proof of identity, then the challenge mechanism 24 hangs (halts) the protected program, or otherwise disturbs normal program execution.

Thus, it can be seen that the protected program continues executing normally only if the customer possesses the proper private keying material and keyfile 105.

Nonce Generator

Figure 4:
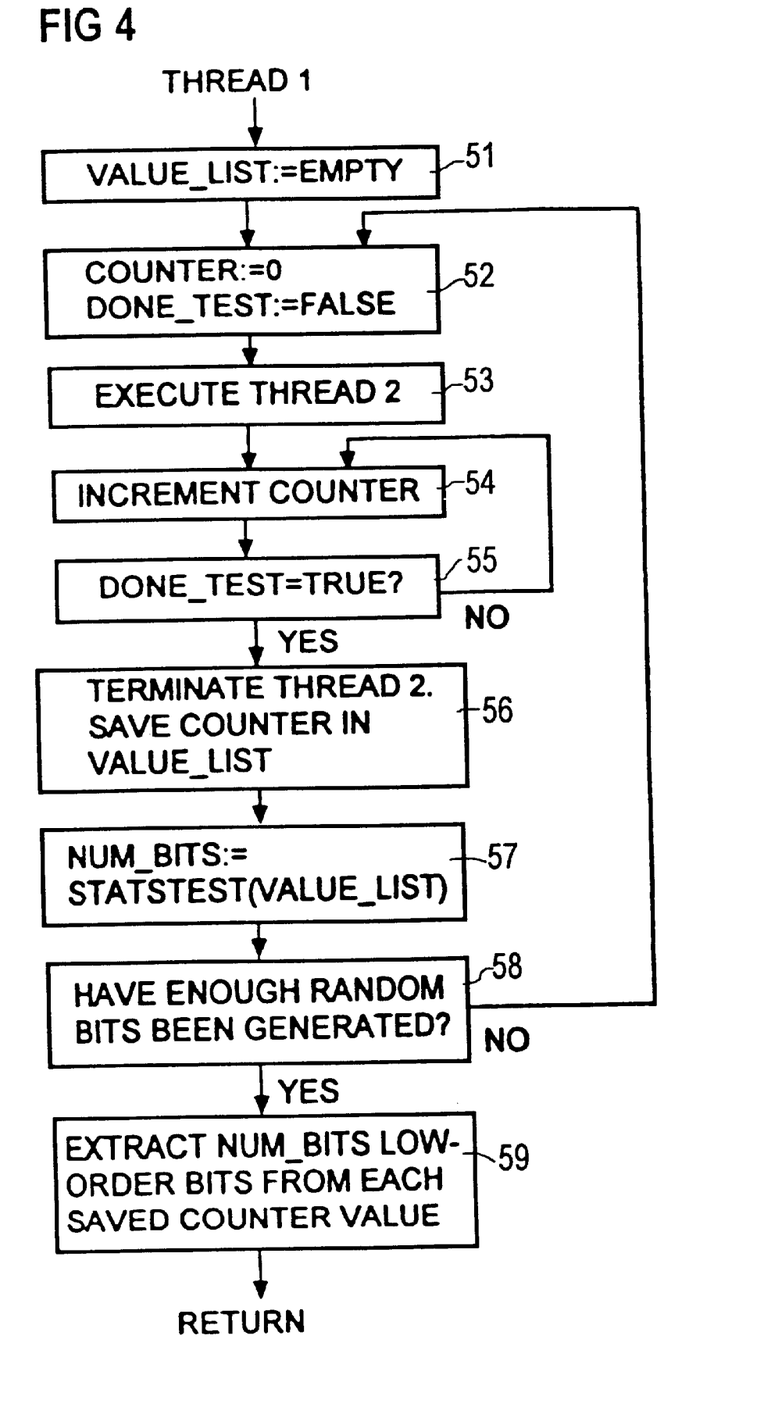
FIG. 4 is a flowchart showing the operation of a random number generator used to generate nonces.

Generation of a nonce is performed by a nonce generator 20 included in the challenge mechanism 24. Operation of the nonce generator is as follows.

First, the nonce generator queries a large number of system parameters, e.g., the system time, the amount of space remaining free in the page table, the number of logical disk drives, the names of the files in the operating system's directory, etc.

Next, the nonce generator builds a random number, using a random number generator. The random number generator consists of two process threads, referred to herein as Thread 1 and Thread 2. FIG. 4 shows the operation of Thread 1, which is the main thread of the random number generator.

(Box 51) Thread 1 first creates a data structure value-list, for holding a list of counter values. The list is initially empty.

(Box 52) Thread 1 sets a current counter value to zero, and sets a done_test flag to FALSE.

(Box 53) Thread 1 then forks Thread 2. Thread 2 posts an asynchronous disk access, and then sleeps until the disk access is complete. When the disk access is complete, Thread 2 sets the done-test flag to TRUE. Note that Thread 1 and Thread 2 share the done_test flag.

(Box 54) Thread 1 increments the counter value by one.

(Box 55) Thread 1 then tests whether the done-test flag is now TRUE, indicating that the disk access initiated by Thread 2 is complete. If done_test flag is FALSE, the thread returns to box 54. Thus, it can be seen that while waiting for the disk access to complete, Thread 1 continually increments the counter value.

(Box 56) When done_test flag is TRUE, Thread 1 terminates Thread 2 and saves the counter value in the first free location in value-list.

(Box 57) Thread 1 then calls a Statstest function, which estimates the degree of randomness of the counter values (or portions of counter values, e.g., low-order bits) saved in value-list. This function may use the Chi-Square Test, the Kolmogorov-Smirnov Test, or the Serial Correlation Test, which are described in the Menezes book. The Statstest function may be optimized to ensure that complicated calculations are not repeated for each disk access. The Statstest function returns a value which indicates how many low-order bits of each saved counter value should be considered random.

(Box 58) Thread 1 compares the value returned by the Statstest function when combined with the length of the value-list with a predetermined threshold value, to determine whether enough random bits have now been generated. If not enough random-bits have been generated, the process returns to box 52 above, so as to generate and save another counter value.

(Box 59) When the required number of random bits has been generated, Thread 1 extracts the specified number of low-order bits from each counter value in the value-list, and returns this sequence of bits as the output random number.

In summary, it can be seen that the random number generator exploits the unpredictability in the timing of a series of disk accesses as a source of randomness in the generation of nonces (see the Fenstermacher publication). By forking new threads on each disk access, the random number generator also exploits unpredictabilities in the operation of the operating system's scheduler as a second source of randomness.

The analysis performed by the Statstest function permits the random number generator to self-tune for any speed processor and disk by computing the number of low-order bits of each saved counter value to return. For example, a system with a high-variance disk access time will generate more random bits per-disk access than a system with a low-variance disk access time. For example, for a Quantum 1080s disk (6 ms average write time), and a 486 Intel (80486) 66 Mhz processor, the system generates approximately 45 bits per second. Alternatively, one may hard code the number of bits per-disk access and use a de-skewing technique to ensure a good degree of randomness.

The nonce generator also queries the operating system to ensure that it posts each disk access to an actual disk. The final output nonce is formed by combining the output random number from the random number generator with the result of querying the system parameters as described above using a message digest.

The nonce generator described above works best when executing on an operating system that provides direct access to the disk, e.g., Microsoft Windows 95 or Microsoft Windows NT 4.0. In such an operating system, special operating system calls available to programs executing in user space permit a program to bypass the operating system's internal buffering mechanism and write directly to the disk. Most programs do not take advantage of these special operating system calls because they may be relatively inefficient and difficult to use. On Windows 95 and Windows NT, a program may only use these special calls if the program accesses data that is a multiple of the disk's sector size by querying the operating system.

If the operating system does not provide direct access to the disk, then the challenge mechanism 24 could still use the disk timing random number generator. However, in this case, the quality of the generated values would have a greater reliance upon unpredictabilities in the operating system's scheduler as opposed to the variance inherent to the disk access time.

The example of the invention described above assumes that the operating system permits a program to fork multiple threads within a single address space. Additionally, the example of the invention assumes that the operating system permits the threads to access synchronization variables such as semaphores. Most modem operating systems provide these services. The example of the invention uses multiple threads to implement a mechanism which quantifies each disk access time. However, if an implementation of the invention were to execute on a system that does not provide multiple threads or synchronization variables, then the nonce generator could substitute other mechanisms, e.g. querying a physical clock.

Some Possible Modifications

The customer need not get the software by downloading the software from a network bulletin board. The customer may also get the software on a floppy disk, CD-ROM at a PC store, via the Internet, or some other distribution media.

The protection server 20 could also work in an alternative way. After having checked the nonce presented to it, it may use, e.g., the Feige-Fiat-Shamir scheme, but also the or Statistical zero knowledge proof schemes, e.g., the Brassard scheme or the Crepau scheme, etc.

Alternatively, the protection server 20 could also use a witness hiding proof scheme, e.g., the Feige-Shamir scheme, etc.

Thus, it can be seen that it is only important in accordance with the present invention that a probabilistic proof is used.

Furthermore, a smart card may be used to store and access the customer's private keying material (or the vendor's private keying material used in keyfile generation). In such a smart card-enabled configuration, a pirate cannot extract the private keying material from the smart card, which provides an even greater defense against attack. Some smart cards do not execute until the user supplies a correct password or personal identification number.

In addition to implementing copy protection, the invention may be used to trace software pirates. The mechanism provides excellent traceability, without requiring that each customer obtain a unique version of the program.

The protection server 20, the challenge mechanism 24, and the protected software 103 described above may be deployed in a number of different configurations.

For example:

The protection server 20 may reside in one address space and the challenge mechanism 24 and the protected software 103 may reside in a different address space in a single machine.

The protection server 20 may reside in an address space on one machine and the challenge mechanism 24 and the protected software 103 may reside in a different address space on a different machine.

Furthermore, multiple customers, each with their own copy of the protected item of software, may share a common protection server 20, which responds to challenges from all these copies.

Another alternative is that multiple customers may share common private keying material. A company may use one or more of these deployment options, for example, when constructing multi-user licensing functionality.

In the embodiment described above, the challenge mechanism 24 uses a random number generator to ensure freshness of the protocol. The freshness property ensures that an attacker cannot thwart the system's security guarantees by replaying old messages. The response mechanism also uses a random number generator to ensure uniqueness of each protocol execution.

The present example may optionally be extended by constructing the challenge means to reference an internal timer, e.g., a counting thread, or an external timer, e.g., a clock. If an a priori defined threshold terminates before completing the probabilistic proof protocol, then the validation automatically fails.

In another possible modification, the keyfile 105 may contain hidden information concerning selective activation of services of the protected program 103. For example, the keyfile 105 may specify that the protected program 103 may permit execution of a Print service but disable execution of a Save-On-Disk service. As another example, the keyfile 105 may contain an expiration date that describes the last date that a particular service may execute. The protected program 103 would read the keyfile 105 to determine the services that the protected program 103 should execute. A customer could obtain the ability to execute more services by requesting another keyfile from the vendor.

In another possible modification, the protected program could distribute the result of the asymmetric confidentiality proofs to other programs. These other programs could use this result to help determine if the other programs should cease executing, or be executed in a limited manner.

Though in the above embodiment, the GQ (Guillou-Quisquater) identification protocol is described, any probabilistic proof scheme may be used in this invention. An overview on probabilistic proof schemes is given in the Menezes book.

In another possible modification, there exist different mechanisms by which the software vendor can implement the way in which the public and private keying material are generated.

Consider two asymmetric key pairs, a first key pair $AS_1$, and a second key pair $AS_2$.

The first key pair $AS_1$ is Associated Assuming Disclosure (AAD) with the second key pair $AS_2$, if it is computationally feasible, e.g., computable in polynomial time using known techniques, to generate the second key pair's $AS_2$ private key given any or all of the following information: the first key pair's $AS_1$, public key, the first key pair's $AS_1$ private key, and the second key pair's $AS_2$ public key.

The first key pair $AS_1$ is Associated Assuming Nondisclosure (AAN) with second key pair $AS_2$ if it is not computationally feasible, e.g., not computable in polynomial time using known techniques, to generate the $AS_2$ private key given no information other than the following: the first key pair's $AS_1$ public key, the first key pair's $AS_1$ private key, and the second key pair's $AS_2$ public key as an input.

The first key pair $AS_1$ is associated with second key pair's $AS_2$ if and only if given no information other than the first key pair's $AS_1$, public key and the second key pair's $AS_2$ public key, it is computationally feasible to discover that first key pair $AS_1$ is AAD associated with $AS_2$ or that the first key pair $AS_1$ is at least AAN associated with $AS_2$.

Demonstrating the associated property may be useful in many different circumstances. For example, suppose that the first key pair $AS_1$ is a probabilistic proof key pair and the second key pair $AS_2$ is a digital signature key pair. In this case, if the customer were to disclose his or her probabilistic proof private keying material, then the software vendor could potentially locate a certificate that holds the associated digital signature public keying material. After locating the digital signature's public key certificate, the software vendor may potentially execute some administrative action. The AAD property additionally provides incentive to the customer to avoid disclosing the probabilistic proof private key due to fear of losing the ability to securely compute digital signatures.

As an example, consider the Guillou-Quisquater (GQ) zeroknowledge proof protocol and the Rivest-Shamir-Adleman (RSA) scheme.

The following steps describe the mechanism by which we can demonstrate that a GQ key pair is associated with an RSA key pair with the AAN (Associated Assuming Non-Disclosure) property.

Calculate System Parameters:

a. From an RSA key pair presented as an input, compute n and $\Phi$.

b. A defines a public exponent $\upsilon \geq 3$ with $\gcd(\upsilon, \Phi)=1$ where $\Phi=(p-1)(q-1)$ and gcd is the Greatest Common Divisor.

c. A computes a private exponent $s=\upsilon^{-1}$ (mod $\Phi$)

d. System parameters $(\upsilon, n)$ are made available as the public keying material.

User Parameters:

a. A selects and publishes a well known identity I and the redundant identity $J=f(I)$ satisfying $1<J<n$ using a known redundancy function f. An example of the redundancy function f is the redundancy mapping of the preprocessing stage of ISO/IEC 9796, see the ISO standard.

b. A retains as the private keying material $s_A=J^{-s}$ (mod n). The AAN key pair is (private key$=s_a$) and (public key$=(\upsilon,n)$). A discards s without disclosure. A makes known to B, I, f and $J=f(I)$. B validates that $J=f(I)$.

The protocol messages of this version of the GQ proof protocol are presented below:

$$A \rightarrow B: I, x = r^{\upsilon} \pmod{n} \quad (1)$$

$$B \rightarrow A: e \text{ (where } 1 \leq e \leq \upsilon) \quad (2)$$

$$A \rightarrow B: y = r \cdot s_A^e \pmod{n} \quad (3)$$

A proves its identity to B by t executions of the following steps where B accepts A's identity only if all t executions are successful.

a. A selects a random secret integer r (the commitment), $1 \leq r \leq n-1$, and computes (the witness) $x = r^{\upsilon} \pmod{n}$     b. A sends to B the pair of integers (I,x)

c. B selects and sends to A a random integer e (the challenge), $1 \leq e \leq \upsilon$     d. A computes and sends to B (the response) $y = r \cdot s_A^e \pmod{n}$     e. B receives y, constructs J from I using f, computes $z = J^e \cdot y^{\upsilon} \pmod{n}$ and accepts A's proof of identity if both $z = x$ and $z \neq 0$.

The following steps describe the mechanism to create an AAD key pair.

First calculate the system parameters as in the case of an AAN key pair. However, the AAD (associated assuming disclosure) private keying material is s, and the public keying material is $(\upsilon, n)$. No user parameters are calculated.

The protocol messages are given below:

$$A \rightarrow B: x = r^{\upsilon} \pmod{n}$$

$$B \rightarrow A: e, J \text{ (where } 1 \leq e \leq \upsilon) \text{ and } 1 < J < n$$

$$A \rightarrow B: y = r \cdot s_A^e \pmod{n}, \text{ where } s_A = J^{-s} \pmod{n}$$

A proves its identity to B in a similar manner as in the case described above. B calculates J using a known redundancy function as described above. However, upon each execution of the protocol B uses a different, randomly chosen value of I in its calculation of J.

A test that demonstrates to B that a GQ key pair is associated with an RSA key pair is a simple test of equality between the modulus of the GQ key and the RSA key after validating a protocol run. Given the GQ private key, B can additionally test for AAD by generating the RSA private key. B then tests to determine if B can generate digital signatures that can be validated by the RSA public key.

If the GQ private keying material were stored on a smart card, from the zero knowledge property, we know that a possible Trojan Horse cannot query the smart card and obtain useful information for the purpose of performing cryptoanalysis in order to discover the GQ private keying material. In the case of the AAD key pair, the vendor knows that the customer will protect his or her GQ private key because the customer does not wish to disclose the associated RSA key. In the case of the AAN key pair, the vendor hopes that the customer will not disclose the private key because such a disclosure identifies the associated RSA key pair, which precludes the possibility of anonymity. The vendor would prefer that the sole copy of an AAN GQ key pair reside on a smart card.

Although other modifications and changes may be suggested by those skilled in the art, it is the intention of the inventors to embody within the patent warranted hereon all changes and modifications as reasonably and properly come within the scope of their contribution to the art.

We claim:

1. A computer system for preventing unauthorized use of software, comprising:

a protection mechanism for protecting software, the protection mechanism including challenge means for providing a challenge associated with a protected item of software, and response means for responding to said challenge, to determine whether said response means has access to private keying material, wherein:

a) the challenge means has no access to said private keying material;

b) the response means includes means for proving that said response means has access to the private keying material by interacting with the challenge means using a probabilistic proof scheme,     c) the challenge means includes         means for prohibiting a customer from using at least some of said item of software unless the challenge means determines from said probabilistic proof scheme that said response means in fact has access to said private keying material and thereby preventing unauthorized use of the software,     wherein said challenge means is embedded in said protected item of software.

2. A compute system according to claim 1, wherein said probabilistic proof scheme is a zero knowledge proof scheme.

3. A computer system according to claim 1, wherein said probabilistic proof scheme is a witness hiding proof scheme.

4. A computer-system according to claim 1, wherein said challenge means includes means for issuing a random challenge as information.

5. A computer system according to claim 4, wherein said means for issuing a random challenge includes     means for generating a random challenge by repeatedly timing responses to device accesses.

6. A computer system according to claim 5, wherein said means for generating a random challenge includes     means for forking new threads in such a manner as to introduce an additional degree of randomness into said random challenge by exploiting unpredictabilities in an operating system's scheduler.

7. A computer system according to claim 5, wherein said means for generating a random challenge includes     means for performing a statistical test to determine a number of random bits obtained by each of said device accesses, and     means for causing device accesses to be repeated until a predetermined number of random bits has been obtained.

8. A computer system according to claim 1, wherein said challenge means uses public keying material for encrypting information.

9. A computer system according to claim 8, further comprising: a keyfile for holding the public keying material.

10. A computer system according to claim 9, wherein the public keying material held in said keyfile is cryptographically secured so that no portion of the keyfile, including the public keying material, can be altered without altering the challenge means.

11. A computer system according to claim 10, wherein said keyfile includes information identifying a customer to whom the protected item of software has been supplied.

12. A computer system according to claim 10, wherein said keyfile includes decoy bits for disguising the public keying material held therein.

13. A computer system according to claim 10, wherein said keyfile includes information concerning selective activation of services of the protected item of software.

14. A computer system according to claim 1, further comprising: a plurality of protected items of software, each having its own challenge means, and a single response means shared between all of said protected items.

15. A computer system in accordance with claim 1, further comprising:
   a storage system that holds at least some of the private keying material which interacts via a protocol that does not suffer degradation of security with each use.

16. A computer system in accordance with claim 1, wherein the challenge means or a third party can validate that the private keying material used in the response means is constructed with knowledge of factorization of a modulus of an associated asymmetric key pair.

17. A computer system according to claim 1, wherein disclosure of the private keying material provides an efficient mechanism for computing the factorization of an associated asymmetric key pair.

18. A computer system according to claim 17, wherein disclosure of the private keying material does not provide sufficient information to discover the prime factors of an associated asymmetric key pair.

19. A computer system according to claim 17, wherein disclosure of the private keying material provides sufficient information to discover the prime factors of an associated asymmetric key pair.

20. A computer system according to claim 17, wherein the storage system that holds at least some of the private keying material interacts via a protocol that does not suffer degradation of security with each use.

21. A computer system according to claim 1, further comprising:
   a storage system that holds at least some of the private keying material interacts via a protocol that resists chosen-plaintext attacks.

22. A computer system according to claim 1, further comprising:
   a storage system that holds at least some of the private keying material interacts via a protocol that resists adaptive chosen-plaintext attacks.

23. A method of distributing software to a plurality of customers, comprising the steps of:
   providing each customer with a computer system having a protection mechanism for protecting software, the protection mechanism including challenge means for providing a challenge associated with a protected item of software, and
   response means for responding to said challenge, said response means having access to private keying material, wherein:
   a) the challenge means has no access to private keying material,
   b) the response means includes
      means for proving that said response means has access to the private keying material by interacting with the challenge means using a probabilistic proof scheme,
   c) the challenge means includes
      means for prohibiting a customer from using at least some of said item of software unless the challenge means knows that said probabilistic proof scheme is successful, and
   providing every customer with an identical copy of said protected program and of said challenge means.

24. A method for protecting an item of software, comprising the steps of:
   associating challenge means with said protected item of software, and
   accessing private keying material by a response means, wherein
   a) the challenge means has no access to the private keying material,
   a) the response means proving that it has access to the private keying material by interacting with the challenge means using a probabilistic proof scheme,
   b) the challenge means prohibiting a customer from using at least some of said items of software unless the challenge means knows that said probabilistic proof is successful.

25. A method according to claim 24, wherein said probabilistic proof scheme is a zero knowledge proof scheme.

26. A computer system according to claim 24, wherein said probabilistic proof scheme is a witness hiding proof scheme.

27. A method according to claim 24, wherein said challenge means performs the step of issuing a random challenge as information.

28. A method according to claim 27, further comprising the step of:
   generating the random challenge by repeatedly timing responses to disk accesses.

29. A method according to claim 28, further comprising the step of:
   generating the random challenge in a way that new threads are forked in such a manner as to introduce an additional degree of randomness into said random challenge by exploiting unpredictabilities in an operating system's scheduler.

30. A method according to claim 28, further comprising the step of:
   generating the random challenge in a way that a statistical test is performed to determine a number of random bits obtained by each of said disk accesses, and
   causing disk accesses to be repeated until a predetermined number of random bits has been obtained.

31. A method according to claim 24, further comprising the step of:
   embedding said challenge means in said protected item of software.

32. A method according to claim 24, wherein said challenge means performs the step of: using public keying material for encrypting information.

33. A method according to claim 32, further comprising the step of: holding the public keying material in a keyfile.

34. A method according to claim 33, further comprising the step of:
   cryptographically securing the first public keying material held in said keyfile, whereby it is computationally infeasible to alter any portion of the keyfile, including the public keying material, without altering the challenge means.

35. A method according to claim 34, wherein said keyfile includes information identifying a customer to whom the protected item of software has been supplied.

36. A method according to claim 34, wherein said keyfile includes decoy bits for disguising the public keying material held therein.

37. A method according to claim 34, wherein said keyfile includes information concerning selective activation of services of the protected item of software.

38. A method according to claim 24, further comprising the step of:
   providing a plurality of protected items of software, each having its own challenge means, and a single response means shared between all of said protected items.

39. A method according to claim 24, further comprising the step of:

validating by the challenge means or a third part that construction of the private keying material used in the response means uses knowledge of the factorization of the modulus of an associated asymmetric key pair.

40. A method according to claim 39, wherein disclosure of the private keying material provides a mechanism for computing the factorization of an associated asymmetric key pair.

41. A method according to claim 39, wherein disclosure of the private keying material provides insufficient information to discover prime factors of an associated asymmetric key pair.

42. A method according to claim 39, wherein disclosure of the private keying material provides sufficient information to discover prime factors of an associated asymmetric key pair.

43. A method according to claim 24, further comprising the steps of:

holding in a storage system at least some of the private keying material, said storage system interacting via a protocol that resists chosen-plaintext attacks.

44. A method according to claim 24, further comprising the steps of:

holding in a storage system at least some of the private keying material, said storage system interacting via a protocol that resists adaptive chosen-plaintext attacks.

* * * * *